United States Patent Office 3,085,116
Patented Apr. 9, 1963

3,085,116
STABILIZED CHLOROFLUOROALKANES
Donovan E. Kvalnes, Chadds Ford, Pa., assignor to E. I. du Pont de Nemours and Company, Wilmington, Del., a corporation of Delaware
No Drawing. Filed Mar. 10, 1961, Ser. No. 94,689
6 Claims. (Cl. 260—652.5)

This invention relates to chlorofluoroalkane compositions and particularly to certain chlorofluoroalkanes containing minor proportions of compounds which inhibit reaction of the chlorofluoroalkanes with primary and secondary alcohols.

Although it has been known for several years that perfluorinated olefins are sensitive to attack by oxygen, saturated fluorine-containing perhalogenated hydrocarbons are considered to be stable under ordinary conditions and, indeed, oxidation and hydrolysis, which cause the decomposition of other halogenated hydrocarbons, have no effect on the fluorine-containing compounds. Recently, it was reported that certain fluorine-containing perhaloalkanes, including trichlorofluoromethane, react fairly rapidly with alkanols in the presence of silver ions to give hydrogen halide, an aldehyde or ketone (depending on whether a primary or secondary alcohol is involved) and a reduced halogenated organic compound wherein one chlorine or bromine has been replaced by hydrogen [Heberling, Jr., et al., J.A.C.S., 78, 5433 (1956)]. The silver ion naturally reacts with the hydrogen halide to precipitate silver halide. Silver ion was shown to catalyze the reaction but not to be a necessary reactant, albeit the reaction is very much slower without silver ion. The reaction was not reported for trichlorofluoromethane in the absence of silver ions. The reaction that occurs between trichlorofluoromethane and ethyl alcohol is as follows:

$CCl_3F + CH_3CH_2OH \rightarrow CHCl_2F + CH_3CHO + HCl$

This reaction does not appear to occur with more highly fluorinated chlorofluoromethanes such as dichlorodifluoromethane. The reaction occurs only in the presence of primary and secondary alcohols; tertiary alcohols being unreactive, and is briefly inhibited by hydroquinone. In the pure state, trichlorofluoromethane is quite stable.

In the past, the reaction of trichlorofluoromethane with alcohols was of little consequence since these two compounds were seldom used together. Recently, certain aerosol formulations which involve the use of trichlorofluoromethane and ethyl alcohol (e.g. aerosol "hair sprays") have become large scale commercial products and the above described reaction has become a serious problem. Not only does the product, acetaldehyde, have an objectionable odor and form colored and odoriferous condensation products, but the hydrogen chloride seriously attacks the metallic container forming insoluble metal salts and hydrogen. The formaton of hydrogen leads to a rapid increase in pressure within the container which, in combination with the weakening of the container due to corrosion, often leads to bulging and rupture of the aerosol container. The other product of the reaction, dichloromonofluoromethane, also leads to a pressure increase within the container but this is not nearly so serious as that due to hydrogen. Although hydrogen chloride is formed, both in the reaction of chlorofluoroalkanes with alcohols and in the decomposition of some chlorinated hydrocarbons, the cause of the formation of the hydrogen chloride is fundamentally different. The chlorofluoroalkanes form HCl only in the presence of primary and secondary alcohols and are stable on storage under conditions which cause chlorinated hydrocarbons to decompose.

The subject of inhibiting the reaction of trichlorofluoromethane with an alcohol must be considered from the viewpoint of the end use. The trichlorofluoromethane is used as the propellant, usually as one member of a propellant mixture, and the alcohol usually is used as the solvent for a solid or liquid material which is to be dispensed via an aerosol system. The inhibitor used must, therefore, not be objectionable in the end use intended. Most of these aerosols come in contact with human beings and the inhibitor must be harmless to humans. The products of the reaction, being colored, odoriferous and acidic, are objectionable and harmful to humans and therefore their formation must be prevented. The ever-present possibility of violent rupture of the aerosol container due to hydrogen pressure is also dangerous to humans and must be prevented. There is thus good cause not only to find inhibitors for the reaction but also to find inhibitors which are harmless to humans.

It is known now that the reaction between alcohols and trichlorofluoromethane takes place most rapidly when air is essentially absent. Since air itself inhibits the reaction, almost any compound will inhibit the reaction of sufficient air is present but only certain compounds will inhibit the reaction if air is essentially absent. While it may seem feasible to inhibit the reaction by merely leaving air in the aerosol container, this procedure is not tenable from a practical viewpoint. It does not appear to be possible to leave a controlled amount of air in such a system. Uncontrolled amounts of air are dangerous due to the rather limited pressure service range of aerosol containers and the possibility that the uncontrolled amount of air may cause the pressure to exceed the strength of the container (cf. the result from too much hydrogen). Air also has a deleterious effect on the components of many aerosol formulations, e.g. perfumes.

Trichlorotrifluoroethanes and tetrachlorodifluoroethanes are frequently employed in admixture with primary and secondary alcohols as solvent media for cleaning, e.g. degreasing, dewaxing, and the like, of electronic equipment, compressors, photographic film, lithographic plates, typewriters, sensitive instruments, gauges, and the like, and for removing varnish, rosin, and like coatings from printed electrical circuits. In such uses, the formation of hydrogen chloride and of colored and odoriferous condensation products are objectionable and harmful to humans and to the equipment being cleaned. Therefore, it is important to inhibit the reaction of these chlorofluoroalkanes with alcohols in these uses.

The chlorofluoroalkanes, e.g. $CFCl_3$, $C_2F_3Cl_3$ and $C_2F_2Cl_4$, react with primary and secondary polyols in the same manner as they do with primary and secondary monohydric alcohols, i.e. to form hydrogen chloride, an aldehyde or ketone, and a reduced haloalkane, i.e. $CHFCl_2$, $C_2HF_3Cl_2$ or $C_2F_2HCl_3$. The mechanism of the reaction with polyols is the same as that with the monohydric alcohols. Polyols are extensively used in combination with trichlorofluoromethane and trichlorotrifluoroethane for preparing urethane foams by reaction with polyfunctional isocyanates. The products, formed by the reaction of these chlorofluoroalkanes with polyols, adversely affect the properties of the urethane foams which are prepared from them as well as interfering with the foam producing reaction. For this reason, it is desirable to also inhibit the reaction between the above chlorofluoroalkanes and polyols.

It is an object of this invention to provide means to inhibit the reaction between primary and scondary alcohols and trichlorofluoromethane, trichlorotrifluoroethanes and tetrachlorodifluoroethanes. A particular object is to provide inhibitors for such purposes which are volatile, non-acidic, relatively non-toxic, relatively inexpensive, and which are effective in small concentrations and for reasonably long periods of time. Other objects are to provide new compositions of matter and to advance the art. Still other objects will appear hereinafter.

The above and other objects may be accomplished in accord with this invention which comprises a composition resistant to reaction with primary and secondary alcohols which consists essentially of a chlorofluoroalkane of the group consisting of trichlorofluoromethane, trichlorotrifluoroethanes and tetrachlorodifluoroethanes and from about 0.1% to about 5% by weight of a mononitroalkane of 1 to 3 carbon atoms.

It has been found that, if the aforesaid mononitroalkanes are present when the aforesaid chlorofluoroalkanes are brought into contact with primary and secondary alcohols, the reaction normally occurring between the chlorofluoroalkane and the alcohol is effectively inhibited for periods of at least 6 months under ordinary storage conditions. Said nitroalkanes are volatile, non-acidic, substantially non-toxic, low in cost and are highly effective in small concentrations. They do not have objectionable odor or color and are not corrosive to metals and do not attack most materials with which the compositions of this invention will ordinarily be brought into contact. The mechanism by which these compounds inhibit the reaction between the chlorofluoroalkanes and the alcohols is not known with certainty and could not be predicted.

The inhibiting effect is specific to the mononitroalkanes. Hydroquinone, 2-nitro-1-butanol, free radical inhibitors, and, in general, compounds known to be useful for inhibiting the decomposition of chlorinated hydrocarbons, are not useful for the purposes of this invention because of little or no effectiveness to inhibit the reaction, low volatility, cost, objectionable odor or color, toxicity, acidity, and like defects.

The primary and secondary alcohols include monohydric and polyhydric alcohols in which at least one alcoholic hydroxyl group is attached to a primary or a secondary carbon atom. In the polyhydric alcohols, it is not necessary that all alcoholic hydroxyl groups be attached to primary or secondary carbon atoms, but some of them may be attached to tertiary carbon atoms. Usually, the alcohols involved are the neutral aliphatic alcohols that consist of carbon, hydrogen and oxygen, which may include ether or carboxy ester groups. In aerosol compositions and in solvent mixtures, the alcohols involved usually are the primary and secondary alkanols which are normally liquid, i.e. at normal temperatures and pressures. Mose usually, the alkanols are the lower alkanols, i.e. containing 1–4 carbon atoms, such as methanol, ethanol, propanol, isopropanol, n-butanol, isobutanol, secondary butanol, ethylene glycol, propylene glycol, glycerol, and the sugar alcohols, e.g. sorbitol. In the preparation of urethane foams, the alcohols usually involved are the primary and secondary polyols. The polyols are polymeric materials containing a plurality of alcoholic hydroxyl groups such as the polyglycols, e.g. polyethylene glycol and polypropylene glycol, and condensation products of alkylene oxides with sugar alcohols, e.g. the condensation product of propylene oxide with sorbitol, and the like. Such polyols usually contain ether groups and may contain carboxylic ester groups.

The chlorofluoroalkanes to be used or treated in accord with this invention are trichlorofluoromethane, 1,1,2-trichloro - 1,2,2 - trifluoroethane, 1,1,1-trichloro-2,2,2-trifluoroethane, tetrachloro - 1,2 - difluoroethane, and tetrachloro-2,2-difluoroethane. The invention is most preferably applied to trichlorofluoromethane.

The inhibiting compounds are mononitroalkanes of 1 to 3 carbon atoms, i.e. nitromethane, nitroethane, 1-nitropropane and 2-nitropropane, and mixtures of any two or more thereof. Nitromethane and nitroethane are preferred. Nitroalkanes of more than 3 carbon atoms are less useful because of their low volatility and because they generally require undesirably large proportions to produce the desired prolonged inhibiting effect.

The nitroalkane will be employed in a proportion of from about 0.1% to about 5% by weight based on the chlorofluoroalkane. Materially smaller proportions are less effective and for shorter periods of time. Larger proportions of the nitroalkanes may be employed but are unnecessary for most purposes and tend to be uneconomical.

The nitroalkanes are soluble in both the chlorofluoroalkanes and the alcohols. Also, the chlorofluoroalkanes and the alcohols are soluble in each other. The nitroalkane can be added to the chlorofluoroalkane, or to the alcohol, or to compositions containing either or both the chlorofluoroalkane and the alcohol. The alcohol may be mixed with another solvent or it may be a component (e.f. a solvent) of a material to be dispensed as an aerosol. The trichlorofluoromethane may, and usually will be a member of a mixture of propellents, the other members of which are lower boiling (higher pressure) chlorofluoroalkanes, such as dichlorodifluoromethane, dichlorotetrafluoroethane, monochlorodifluoromethane, 1,1-difluoroethane and octafluorocyclobutane. Sometimes, normally gaseous alkanes, such as propane, butane and isobutane are included in minor proportions in such propellent mixtures. A representative propellent mixture consists of 45% by weight of trichlorofluoromethane, 45% by weight of dichlorodifluoromethane and 10% by weight of isobutane. It is preferred to add the nitroalkane to the chlorofluoroalkane or to a propellent mixture containing it, so that it will be present when the chlorofluoroalkane comes into contact with or is admixed with a primary or secondary alcohol or with compositions containing such alcohols.

In order to more clearly illustrate this invention and the advantageous results to be obtained thereby, examples are given hereinafter in Tables I to IX (including duplicate experiments in certain cases); together with, in Table II for purposes of comparison, examples of other compounds which are closely related or which have been disclosed in the prior art to be useful for inhibiting the decomposition of chlorinated hydrocarbons.

In evaluating the various compounds as inhibitors in Tables I and II, the test of storing the composition for 6 months at 100° F. was employed. This test is standard in the aerosol industry for evaluating the effects on aerosol cans of various materials which might be used therein. The inhibitors were evaluated on the basis of three criteria, the odor of the solution, the color of the solution, and corrosion of the metallic aerosol container, after storage for 6 months at 100° F.

In more detail, the testing and evaluation of the compounds as inhibitors in Tables I and II was carried out as follows:

The compound was dissolved at the desired concentration in specification 39–C denatured alcohol (39–C alcohol contains 1 gallon of diethyl phthalate per 100 gallons of 200 proof ethyl alcohol). Trichlorofluoromethane (120% of the required amount) was added and then 150 g. of the mixture was placed in a tin-plated steel aerosol container and the excess trichlorofluoromethane allowed to boil off to expel air until the mixture contained 70% by weight trichlorofluoromethane, the remaining 30% being the alcohol solution containing the prospective inhibitor in the desired concentration. The aerosol container was then capped and allowed to stand in a constant temperature room at 100° F. for six months. At the end of six months, the can and contents were examined; the color visually, the odor by comparison with a duplicate of the original mixture, and the "pH" by use of a Beckman pH meter using the calomel and glass electrodes. The "pH" values determined should only be compared among themselves, the values are not directly correlatable with hydrogen ion concentration because the readings are taken in an alcohol solution. Corrosion of the cans was evaluated as follows: no visual change—no corrosion; discoloration or very slight etching—slight corrosion; visual, mild attack on metal, no salt deposits—moderate corrosion; heavy attack on metal accompanied, usually, by salt deposits, bulging and/or perforation of the can—severe corrosion. A prospective inhibitor was considered satisfactory if no color or odor was produced, if insufficient corrosion took place to weaken the aerosol container, and if insufficient hydrogen was formed to cause dangerously high pressures (i.e. moderate corrosion or less).

*Table I*

| No. | Inhibitor | Weight percent of inhibitor in $CCl_3F$ | Results of storage at 100° F. for six months ||||
|---|---|---|---|---|---|---|
| | | | pH | Odor | Color | Corrosion |
| I | Nitromethane | 2.0 | 4.0 | No change | None | None. |
| | | 1.0 | 4.8 | ----do---- | ----do---- | Moderate. |
| | | 0.5 | 5.0 | ----do---- | ----do---- | Do. |
| | | 0.1 | 3.7 | ----do---- | ----do---- | Do. |
| | | 0.01 | 3.3 | ----do---- | ----do---- | Severe. |
| | | 0.001 | (1) | (1) | (1) | (1). |
| II | Nitromethane | 1.0 | 4.1 | No change | None | Moderate. |
| | | 0.5 | 3.2 | ----do---- | Yellow | Do. |
| | | 0.1 | 2.8 | ----do---- | ----do---- | Do. |
| | | 0.01 | 2.3 | Pungent | None | Severe. |
| | | 0.001 | 2.3 | ----do---- | Dark green | Do. |
| III | Nitroethane | 1.0 | 2.6 | No change | None | Slight. |
| | | 0.5 | 3.7 | ----do---- | ----do---- | Moderate. |
| | | 0.1 | 3.4 | ----do---- | ----do---- | Do. |
| | | 0.01 | 2.5 | ----do---- | Yellow | Do. |
| | | 0.001 | 1.3 | Pungent | | Do. |
| IV | Nitroethane | 1.0 | 3.8 | No change | | Slight. |
| | | 0.5 | 3.8 | ----do---- | None | Moderate. |
| | | 0.1 | 3.5 | ----do---- | ----do---- | Do. |
| | | 0.01 | 1.7 | Pungent | ----do---- | Do. |
| | | 0.001 | (1) | (1) | (1) | (1). |
| V | 2-nitropropane | 2.0 | 4.8 | None | None | Slight. |
| | | 1.0 | 5.5 | ----do---- | ----do---- | Moderate. |
| | | 0.5 | 5.2 | ----do---- | ----do---- | Do. |
| | | 0.1 | 5.2 | ----do---- | ----do---- | Do. |
| | | 0.01 | 4.6 | Slightly pungent | Yellow | Do. |
| | | 0.001 | 4.5 | Pungent | ----do---- | Do. |
| VI | Control | 0 | (1) | (1) | (1) | (1). |

[1] Containers bulged and leaked before end of test period.

*Table II*

| No. | Inhibitor | Weight percent of inhibitor in $CCl_3F$ | Results of storage at 100° F. for six months ||||
|---|---|---|---|---|---|---|
| | | | pH | Odor | Color | Corrosion |
| I | Diisobutylene | 1.0 | 1.2 | Pungent | Brown | Moderate. |
| | | 0.5 | 1.5 | ----do---- | ----do---- | Do. |
| | | 0.1 | 1.4 | ----do---- | ----do---- | Severe. |
| | | 0.01 | 1.5 | ----do---- | ----do---- | Do. |
| | | 0.001 | 1.3 | ----do---- | ----do---- | Do. |
| II | t-Butanol | 2.0 | (1) | (1) | (1) | (1). |
| | | 1.0 | (1) | (1) | (1) | (1). |
| | | 0.5 | (1) | (1) | (1) | (1). |
| | | 0.1 | (1) | (1) | (1) | (1). |
| | | 0.01 | (1) | (1) | (1) | (1). |
| | | 0.001 | (1) | (1) | (1) | (1). |
| III | Hydroquinone | 0.5 | (1) | (1) | (1) | (1). |
| | | 0.1 | (1) | (1) | (1) | (1). |
| IV | Nickel sulfate | (2) | (1) | (1) | (1) | (1). |
| V | $CH_3CH_2CH(NO_2)-CH_2OH$ | 1.0 | 5.2 | Pungent | Brown | Moderate. |
| | | 0.5 | 5.1 | ----do---- | ----do---- | Lo. |
| | | 0.1 | 4.2 | ----do---- | ----do---- | Severe. |
| | | 0.01 | (1) | (1) | (1) | (1). |
| | | 0.001 | 4.3 | Pungent | Brown | Severe. |
| VI | Glycidal methacrylate $CH_2-CH(O)-CH_2-O-C(=O)-C(CH_3)=CH_2$ | 2.0 | 1.8 | ----do---- | Trace | Moderate. |
| | | 1.0 | 3.5 | ----do---- | ----do---- | Do. |
| | | 0.5 | 2.4 | ----do---- | ----do---- | Do. |
| | | 0.1 | 1.5 | ----do---- | Brown | Do. |
| | | 0.01 | 0.7 | ----do---- | ----do---- | Severe. |
| | | 0.001 | 1.2 | ----do---- | ----do---- | Do. |
| VII | Terpene B | 2.0 | (1) | (1) | (1) | (1). |
| | | 1.0 | (1) | (1) | (1) | (1). |
| | | 0.5 | (1) | (1) | (1) | (1). |
| | | 0.1 | (1) | (1) | (1) | (1). |
| | | 0.01 | (1) | (1) | (1) | (1). |
| | | 0.001 | (1) | (1) | (1) | (1). |
| VIII | N-vinyl pyrrolidone | 1.0 | (1) | (1) | (1) | (1). |
| | | 0.5 | (1) | (1) | (1) | (1). |
| | | 0.1 | (1) | (1) | (1) | (1). |
| | | 0.01 | (1) | (1) | (1) | (1). |
| | | 0.001 | (1) | (1) | (1) | (1). |
| IX | Vinyl acetate | 1.0 | 3.9 | Pungent | Brown | Slight. |
| | | 0.5 | 2.6 | ----do---- | ----do---- | Severe. |
| | | 0.1 | 2.6 | ----do---- | ----do---- | Do. |
| | | 0.01 | 4.4 | ----do---- | ----do---- | Do. |
| | | 0.001 | 3.3 | ----do---- | ----do---- | Do. |

*Table II—continued*

| No. | Inhibitor | Weight percent of inhibitor in CCl₃F | Results of storage at 100° F. for six months | | | |
|---|---|---|---|---|---|---|
| | | | pH | Odor | Color | Corrosion |
| X | Vinylidene chloride | 2.0 | 4.0 | No change | None | Slight. |
| | | 1.0 | 4.1 | Pungent | Yellow | Moderate. |
| | | 0.5 | 5.3 | do | do | Do. |
| | | 0.1 | 5.3 | do | Brown | Severe. |
| | | 0.01 | (¹) | (¹) | (¹) | (¹). |
| | | 0.001 | (¹) | (¹) | (¹) | (¹). |
| XI | Benzothiazol | 2.0 | 2.2 | Pungent | Yellow | Slight. |
| | | 1.0 | 2.3 | do | do | Do. |
| | | ³ 0.5 | | | | |
| | | 0.1 | 1.8 | Pungent | Yellow | Moderate. |
| | | 0.01 | 2.0 | do | Brown | Do. |
| | | 0.001 | 1.5 | do | do | Severe. |
| XII | Propargyl alcohol<br>CH≡CCH₂OH | 0.5 | (¹) | (¹) | (¹) | (¹). |
| XIII | Pentene-1 | 0.5 | (¹) | (¹) | (¹) | (¹). |
| XIV | Pentene-2 | 0.5 | (¹) | (¹) | (¹) | (¹). |
| XV | 3-methyl-3-hydroxy-1-butyne<br>(CH₃)₂C(OH)C≡CH | 2.0 | (¹) | (¹) | (¹) | (¹). |
| | | 1.0 | (¹) | (¹) | (¹) | (¹). |
| XVI | Methyl vinyl ketone | 2.0 | (¹) | (¹) | (¹) | (¹). |
| | | 1.0 | (¹) | (¹) | (¹) | (¹). |
| XVII | 1,2-butylene oxide | 2.0 | (¹) | (¹) | (¹) | (¹). |
| | | 1.0 | (¹) | (¹) | (¹) | (¹). |
| | | 0.5 | (¹) | (¹) | (¹) | (¹). |
| | | 0.1 | (¹) | (¹) | (¹) | (¹). |
| | | 0.01 | (¹) | (¹) | (¹) | (¹). |
| | | 0.001 | (¹) | (¹) | (¹) | (¹). |

¹ Cans bulged and leaked before end of test period.
² Saturated solution in alcohol.
³ Cans leaked and bulged at end of seven months.

It will be apparent from Table I that the compounds of this invention are satisfactory inhibitors of the reaction between the chlorofluoroalkane and the alcohol for at least six months when employed in concentrations of about 0.1% by weight or higher. At concentrations below 0.1%, these compounds will inhibit the reaction for shorter periods of time, but not for the six months period at 100° F. which is usually desired.

Table II shows that two of the compounds therein are poor inhibitors, e.g. vinyl acetate at 1% or higher and vinylidene chloride at 2% or higher, while the remaining compounds are not inhibitors at any useful concentration.

Unless otherwise noted, all aging tests in Examples III to IX were carried out with mixtures of 70% by weight of the polyol and 30% by weight of the chlorofluoroalkane. Also, unless otherwise specified, the inhibitor concentrations were 0.5 part per 100 parts of polyol-chlorofluoroalkane mixture. All samples were aged in tin-plated steel containers closed with blank tin-plated steel caps. Samples were prepared by adding a 25% excess of the chlorofluoroalkane and allowing the excess to boil-off, carrying the air within the can with it. The cans were then capped immediately. This procedure purges most of the air present.

The concentration of acid in the aged mixtures (mole acid/mole CFCl₃) was determined by titration with standardized alcoholic potassium hydroxide using alpha-naphthol-benzein indicator. The concentration of reduced chlorofluoroalkane in the aged mixture (mole CHFCl₂/mole CFCl₃) was determined by gas chromatographic analysis. The pH values and the can corrosion ratings were determined in the same manner as in Examples I and II.

Samples of the aged mixtures were checked for color changes visually. Samples were also tested for free halide ion with silver nitrate solution. A definite precipitate was called positive; a milky color was called "trace."

The results are shown in the following Tables III to IX, which show the effect of storage of mixtures of inhibitors, chlorofluoroalkanes and either "polyol A" which is the condensation product of one mole of sorbitol with 10 moles of propylene oxide (sold by Atlas Powder Company as "Atlas G2410") or a polypropylene glycol (P2000 having an average molecular weight of 2000, or P400 having an average molecular weight of 400). The structure of the sorbitol derivative is not certain since it is not known whether all of the propylene oxide condenses on one or several hydroxyl groups of the sorbitol. It is certain that the product contains a plurality of primary and secondary hydroxyl groups as well as ether linkages. The polypropylene glycols have the structure

These tests were run at various temperatures. Experience has shown that 48 hours at 194° F. is approximately equivalent to 30 days at 130° F. or six months at 100° F. so far as reaction between the polyols and the chlorofluoroalkanes, can corrosion and acid production are concerned.

Table III

[30% CFCl₃-70% "polyol A" at 130° F.-nitromethane inhibitor]

| Aging period, days | Mole acid/ mole CFCl₃ | Mole CHFCl₂/ mole CFCl₃ | Mole Acid/ mole CHFCl₂ | pH Initial | pH Final | Can corrosion | Color | Silver nitrate test |
|---|---|---|---|---|---|---|---|---|
| 8 [1] | 0.006 | 0.003 | 2/1 | 7.8 | 2.8 | Slight | Yellow | Trace. |
| 8 | Trace | None | | 7.5 | 5.9 | None | ___do___ | Negative. |
| 16 [1] | 0.032 | 0.012 | 2.7/1 | 7.8 | 1.4 | Moderate | ___do___ | Positive. |
| 16 | 0.002 | None | | 7.5 | 5.1 | Slight | ___do___ | Negative. |
| 32 [1] | 0.320 | 0.058 | 5.5/1 | 7.8 | 5.6 | Moderate | Brown | Positive. |
| 32 | 0.012 | 0.004 | 3/1 | 7.5 | 5.7 | Slight | ___do___ | Do. |

[1] Nitromethane omitted.

Table IV

[30% CFCl₃-70% "polyol A", 150° F.-nitromethane inhibitor]

| Aging period, days | Mole acid/ mole CFCl₃ | Mole CHFCl₂/ mole CFCl₃ | Mole Acid/ mole CHFCl₂ | pH Initial | pH Final | Can corrosion | Color | Silver nitrate test |
|---|---|---|---|---|---|---|---|---|
| 4 [1] | 0.017 | 0.010 | 2/1 | 7.8 | 0 | Moderate | No change | Positive. |
| 4 | None | None | | 7.5 | 2.7 | None | ___do___ | Negative. |
| 8 [1] | 0.059 | 0.016 | 3.7/1 | 7.8 | 1.0 | Moderate | Yellow | Positive. |
| 8 | 0.002 | 0.001 | 2/1 | 7.5 | 6.8 | Slight | ___do___ | Negative. |
| 16 [1] | 0.386 | 0.084 | 4.6/1 | 7.8 | 0.1 | Moderate | Black | Positive. |
| 16 | 0.009 | 0.004 | 2.2/1 | 7.5 | 1.7 | ___do___ | Brown | Trace. |

[1] Nitromethane omitted.

Table V

[CFCl₃-"polyol A"-nitromethane inhibitor, 170° F.]

| Aging period, days | Mole acid/ mole CFCl₃ | Mole CHFCl₂/ mole CFCl₃ | Mole Acid/ mole CHFCl₂ | pH Initial | pH Final | Can corrosion | Color | Silver nitrate test |
|---|---|---|---|---|---|---|---|---|
| 1 [1] | 0.003 | Trace | 7/1 | 7.8 | 4.0 | Slight | No change | Positive. |
| 1 | None | None | | 7.5 | 2.8 | None | ___do___ | Negative. |
| 2 [1] | 0.023 | 0.004 | 6/1 | 7.8 | 1.2 | Moderate | Yel. brown | Positive. |
| 2 | None | None | | 7.5 | 3.2 | None | No change | Negative. |
| 4 [1] | 0.051 | 0.310 | 1.6/1 | 7.8 | 0.3 | Moderate | Lt. brown | Positive. |
| 4 | 0.001 | Trace | | 7.5 | 3.1 | Slight | ___do___ | Negative. |

[1] Nitromethane omitted.

Table VI

[30% CFCl₃-70% "polyol A", 194° F.-nitromethane inhibitor]

| Aging period, hours | Mole acid/ mole CFCl₃ | Mole CHFCl₂/ mole CFCl₃ | Mole Acid/ mole CHFCl₂ | pH Initial | pH Final | Can corrosion | Color | Silver nitrate test |
|---|---|---|---|---|---|---|---|---|
| 24 [1] | 0.039 | 0.022 | 1.8/1 | 7.8 | 0.5 | Slight plus | Yel. brown | Positive. |
| 24 | None | None | | 7.5 | 1.7 | Slight | No change | Negative. |
| 48 [1] | 0.078 | 0.044 | 1.8/1 | 7.8 | 0.5 | Moderate plus | Brown | Positive. |
| 48 | 0.001 | 0.002 | | 7.5 | 2.1 | Slight | Yellow | Negative. |

[1] Nitromethane omitted.

Table VII

[30% CFCl₃-70% "polyol A", 194° F.-nitromethane inhibitor]

| Aging period, hrs. | Conc. (weight percent) CH₃NO₂ | Mole acid/ mole CFCl₃ | Mole CHFCl₂/ mole CFCl₃ | Mole acid/ mole CHFCl₂ | Can corrosion | Color | Silver nitrate test |
|---|---|---|---|---|---|---|---|
| 24 | 0 | 0.019 | 0.004 | 5/1 | Slight plus | Yel. brown | Positive. |
| 24 | 0.001 | 0.012 | 0.003 | 4/1 | ___do___ | ___do___ | Do. |
| 24 | 0.01 | 0.011 | 0.002 | 5.5/1 | ___do___ | ___do___ | Do. |
| 24 | 0.10 | 0.012 | 0.003 | 4/1 | ___do___ | ___do___ | Do. |
| 24 | 1.0 | 0.003 | Trace | | ___do___ | ___do___ | Negative. |
| 48 | 0 | 0.394 | 0.055 | 7.2/1 | Severe | Black | Positive. |
| 48 | 0.001 | 0.265 | 0.035 | 7.5/1 | ___do___ | ___do___ | Do. |
| 48 | 0.01 | 0.190 | 0.028 | 6.9/1 | ___do___ | ___do___ | Do. |
| 48 | 0.1 | 0.135 | 0.025 | 5.4/1 | Moderate | Brown | Do. |
| 48 | 1.0 | 0.002 | 0.001 | 2.0/1 | V. slight | Sl. brown yellow | Negative. |

Table VIII

[30% CFCl₃–70% polypropylene glycol (P2000), 194° F.–nitromethane inhibitor]

| Aging period, hrs. | Mole acid/ Mole CFCl₃ | Mole CHFCl₂/ mole CFCl₃ | pH Initial | pH Final | Can corrosion | Color |
|---|---|---|---|---|---|---|
| 24 [1] | 0.009 | None | 6.2 | 0 | Slight | Green yellow. |
| 24 | None | None | 5.8 | 0.7 | do | No change. |
| 48 [1] | 0.017 | 0.004 | 6.2 | 0 | Moderate | Green yellow, ppt. |
| 48 | None | None | 5.8 | 0 | V. slight | No change. |

[30% CFCl₃–70% polypropylene glycol (P400), 194° F.–nitromethane inhibitor]

| 24 [1] | 0.014 | 0.018 | 7.2 | | Moderate | Yellow. |
| 24 | 0.003 | 0.003 | 7.4 | 1.4 | do | Brown. |

[1] Nitromethane inhibitor omitted.

Table IX

[30% CF₂ClCFCl₂–70% "polyol A", 194° F.–nitromethane inhibitor]

| Aging period, days | Mole acid/ mole CF₂ClCFCl₂ | pH Initial | pH Final | Can corrosion | Color | Silver nitrate test |
|---|---|---|---|---|---|---|
| 1[1] | 0.023 | 8.9 | 6.0 | Moderate | Yellow | Positive. |
| 1 | Trace | 9.1 | 8.7 | V. slight | do | Negative. |
| 2[1] | 0.092 | 8.9 | 7.8 | Moderate | Lt. brown | Positive. |
| 2 | 0.001 | 9.1 | 8.9 | V. slight | do | Negative. |

[1] Nitromethane omitted.

It is apparent from Tables III to IX that nitromethane inhibits the reaction between CFCl₃ and CF₂ClCFCl₂ and polyols, lessens corrosion and diminishes acid formation.

It will be understood that the preceding examples have been given for illustrative purposes solely and that this invention is not limited to the specific embodiments described therein. On the other hand, it will be apparent to those skilled in the art that, subject to the limitations set forth in the general description, the materials and proportions may be considerably varied without departing from the spirit or scope of this invention.

From the preceding description, it will be apparent that this invention provides novel compositions of certain chlorofluoroalkanes and certain nitroalkanes which are resistant to the reaction which normally occurs between said chlorofluoroalkanes and primary and secondary alcohols. Therefore, there is provided a means whereby said chlorofluoroalkanes can be employed in conjunction with primary and secondary alcohols and maintained in contact or admixture therewith for long periods of time without the aforesaid undesirable reactions taking place. Accordingly, it will be apparent that this invention constitutes a valuable advance in and contribution to the art.

This is a continuation-in-part of my copending application Serial No. 28,222, filed May 11, 1960, and now abandoned.

The embodiments of the invention in which an exclusive property or privilege is claimed are defined as follows:

1. A composition resistant to reaction with primary and secondary alcohols which consists essentially of a chlorofluoroalkane of the group consisting of trichlorofluoromethane, trichlorotrifluoroethanes and tetrachlorodifluoroethanes and from about 0.1% to about 5% by weight of mononitroalkane of 1 to 3 carbon atoms.

2. A composition resistant to reaction with primary and secondary alcohols which consists essentially of trichlorofluoromethane and from about 0.1% to about 5% by weight of a mononitroalkane of 1 to 3 carbon atoms.

3. A composition resistant to reaction with primary and secondary alcohols which consists essentially of trichlorofluoromethane and from about 0.1% to about 5% by weight of nitromethane.

4. A composition resistant to reaction with primary and secondary alcohols which consists essentially of trichlorofluoromethane and from about 0.1% to about 5% by weight of nitroethane.

5. A composition resistant to reaction with primary and secondary alcohols which consists essentially of trichlorofluoromethane and from about 0.1% to about 5% by weight of 2-nitropropane.

6. A composition resistant to reaction with primary and secondary alcohols which consists essentially of trichlorofluoromethane and from about 0.1% to about 5% by weight of 1-nitropropane.

References Cited in the file of this patent

UNITED STATES PATENTS

| 2,163,899 | Walker et al. | June 27, 1939 |
| 2,185,238 | Whaley | Jan. 2, 1940 |
| 2,567,621 | Skeeters et al. | Sept. 11, 1951 |
| 2,952,547 | Hill | Sept. 13, 1960 |
| 2,983,650 | Rubin | May 9, 1961 |